(12) United States Patent
Mashey (10) Patent No.: US 6,422,818 B2
(45) Date of Patent: Jul. 23, 2002

(54) LUBRICATING SYSTEM FOR THERMAL MEDIUM DELIVERY PARTS IN A GAS TURBINE

(75) Inventor: Thomas Charles Mashey, Coxsackie, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/769,749

(22) Filed: Jan. 26, 2001

Related U.S. Application Data

(63) Continuation of application No. 09/368,458, filed on Aug. 3, 1999, now abandoned.
(60) Provisional application No. 60/095,662, filed on Aug. 7, 1998.

(51) Int. Cl.[7] .................................................. F01D 5/08
(52) U.S. Cl. ..................... 416/96 R; 415/115; 415/114; 415/116; 416/241 B; 277/402; 165/134.1
(58) Field of Search ................................ 415/114, 115, 415/116; 416/95, 96 R, 96 A, 97 R, 241 R, 241 B; 277/399, 402, 403; 165/134.1

(56) References Cited

U.S. PATENT DOCUMENTS

| 4,075,376 A | 2/1978 | Jaeger |
| 5,593,274 A | 1/1997 | Carreno et al. |
| 5,984,637 A | 11/1999 | Matsuo |

OTHER PUBLICATIONS

"39th GE Turbine State–of–the–Art Technology Seminar", Tab 1, ""F" Technology –the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F.J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA –An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines –Design and Operating Features", M.W. Horner, Aug. 1996.
"39th GE Turbine State–of–the–Art Technology Seminar", Tab 7, "Advance Gas Turbine Materials and Coatings", P.W. Schilke, Aug. 1996.
"39th GE Turbine State–of–the–Art Technology Seminar", Tab 8, "Dry Low $NO_x$ Combustion Systems for GE Heavy-Duty Turbines", L.B. Davis, Aug. 1996.
"39th GE Turbine State–of–the–Art Technology Seminar", Tab 9, "GE Gas Turbine Combustion Flexibility", M. A. Davi, Aug. 1996.

(List continued on next page.)

Primary Examiner—Christopher Verdier
(74) Attorney, Agent, or Firm—Nixon & Vanderhye (57) ABSTRACT

Cooling steam delivery tubes extend axially along the outer rim of a gas turbine rotor for supplying cooling steam to and returning spent cooling steam from the turbine buckets. Because of the high friction forces at the interface of the tubes and supporting elements due to rotor rotation, a low coefficient of friction coating is provided at the interface of the tubes and support elements. On each surface, a first coating of a cobalt-based alloy is sprayed onto the surface at high temperature. A portion of the first coating is machined off to provide a smooth, hard surface. A second ceramic-based solid film lubricant is sprayed onto the first coating. By reducing the resistance to axial displacement of the tubes relative to the supporting elements due to thermal expansion, the service life of the tubes is substantially extended.

14 Claims, 8 Drawing Sheets

OTHER PUBLICATIONS

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D.M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J.R. Johnston, Aug. 1996.

"39th GE Turbine State–of–the Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the Art–Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program –Conceptual Design and Product Development", Annual Report, Sep. 1, 1994 Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS) Program, Conceputual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993 –Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Numbers DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to 60% Combined–Cycle Power Plant Efficiency, Press Information, Press Release, Power–Gen Europe '95, 95–NRR15, Advanced Technology Introduction/pp. 1–6.
"Gas, Steam Turbine Work as Single Unit in GE's Advanced H Technology Combined–Cycle System", Press Information, Press Release, 95–NR18, May 16, 1995, Advanced Technology Introduction/pp. 1–3.
"GE Breaks 60% Net Efficiency Barrier" paper, 4 pages.
"GE Businesses Share Technologies and Experts to Develop State–Of–The–Art Products", Press Information, Press Release 95–NR10, May 16, 1995, GE Technology Transfer/pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun. 15, (1995).
"New Steam Cooling System is a Key to 60% Efficiency For GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power Systems for the $21^{st}$ Century –"H" Gas Turbine Combined Cycles", Thomas C. Paul et al., Report,.
"Power–Gen '96 Europe", Conference Programme, Budapest, Hungary, Jun. 26–28, 1996.
"Power–Gen International", 1998 Show Guide, Dec. 9–11, 1998, Orange County Convention Center, Orlando, Florida.
"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, pp. 3–13, Oct., 1995.
"Proceedings of the Advanced Turbine Systems Annual Program Review Meeting", vol. I, "H Gas Turbine Combined Cycle", J. Corman, pp. 14–21, Oct. 1995.
"Proceedings of the Advanced Turbine Systems Annual Program Review Meeting", vol. I, "Overview of Westinghouse's Advanced Turbine Systems Program", Bannister et al., pp. 22–30, Oct. 1995.
"Proceedings of the Advanced Turbine Systems Annual Program Review Meeting", vol. I, "Allison Engine ATS Program Technical Review", D. Mukavetz, pp. 31–42, Oct., 1995.
"Proceedings of the Advanced Turbine Systems Annual Program Review Meeting", vol. I , "Advanced Turbine Systems Program Industrial System Concept Development", S. Gates, pp. 43–63, Oct., 1995.
"Proceedings of the Advanced Turbine Systems Annual Program Review Meeting", vol. I, "Advanced Turbine System Program Phase 2 Cycle Selection", Latcovich, Jr., pp. 64–69, Oct. 1995.
"Proceedings of the Advanced Turbine Systems Annual Program Review Meeting", vol. I, "General Electric ATS Program Technical Review Phase 2 Activites", Chance et al., pp. 70–74, Oct., 1995.
"Proceedings of the Advanced Turbine Systems Annual Program Review Meeting", vol. I, "Technical Review of Westinghouse's Advanced Turbine Systems Program", Diakunchak et al., pp. 75–86, Oct., 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. I, "Advanced Turbine Systems Annual Program Review", William E. Koop, pp. 89–92, Oct., 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/AGTSR Interactions", Sy A. Ali, pp. 103–106, Oct., 1995.
"Proceedings of the Advanced Turbine Systems Annual Program Review Meeting", vol. I, "Design Factors for Stable Lean Premix Combustion", Richards et al., pp. 107–113, Oct., 1995.
"Proceedings of the Advanced Turbine Systems Annual Program Review Meeting", vol. I, "Ceramic Stationary as Turbine", M. van Roode, pp. 114–147, Oct., 1995.
"Proceedings of the Advanced Turbine Systems Annual Program Review Meeting", vol. I, "DOE/Allison Ceramic Vane Effort", Wenglarz et al., pp. 148–151, Oct.,1995.
"Proceedings of the Advanced Turbine Systems Annual Program Review Meeting", vol. I, "Materials/Manufacturing Element of the Advanced Turbine Systems Program", Karnitz et al., pp. 152–160, Oct., 1995.
"Proceedings of the Advanced Turbine Systems Annual Program Review Meeting", vol. I, "Land–Based Turbine Casting Initiative", Mueller et al., pp. 161–170, Oct., 1995.
"Proceedings of the Advanced Turbine Systems Annual Program Review Meeting", vol. I,"Turbine Airfoil Manufacturing Technology", Kortovich, pp. 171–181, Oct., 1995.
"Proceedings of the Advanced Turbine Systems Annual Program Review Meeting", vol. I, "Pratt & Whitney Thermal Barrier Coatings", Bornstein et al., pp. 182–193, Oct., 1995.
"Proceedings of the Advanced Turbine Systems Annual Program Review Meeting", vol. I, "Westinhouse Thermal Barrier Coatings", Goedjen et al., pp. 194–199, Oct., 1995.
"Proceedings of the Advanced Turbine Systems Annual Program Review Meeting", vol. I, "High Performance Steam Development", Duffy et al., pp. 200–220, Oct., 1995.
"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.
"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al,. pp. 310–327, Oct., 1995.

"Proceedings of the Advanced Turbine Systems Annual Program Review Meeting", vol. II "Advanced Combustion Technologies for Gas Turbine Power Plants", Vandsburger et al., pp. 328–352, Oct. 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496, Oct., 1995.

"Proceedings of the Advanced Turbine Systems Annual Program Review", vol. II, "Steam as Turbine Blade Coolant: Experimental Data Generation", Wilmsen et al., pp. 497–505, Oct., 1995.

"Proceedings of the Advanced Turbine Systems Annual Program Review", vol. II, "Combustion Chemical Vapor Deposited Coatings for Thermal Barrier Coatings Systems", Hampikian et al., pp. 506–515, Oct., 1995.

"Proceedings of the Advanced Turbine Systems Annual Program Review Meeting", vol. II "Premixed Burner Experiments: Geometry, Mixing, and Flames Structure Issues", Gupta et al., pp. 516–528, Oct., 1995.

"Proceedings of the Advanced Turbine Systems Annual Program Review Meeeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $No_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_x$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamics Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorscence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramics Gas Turbines in Russia", Mark van Roode, p. 671, Nov., 1996.

"Status Report: The U.S. Department of Energy's Advanced Turbine systems Program", facsimile dates Nov. 7, 1996.

"Testing Program Results Validate GE's H Gas Turbine High Efficiency, Low Cost of Electricity and Low Emissions", Roger Schonewald and Patrick Marolda, (no date available).

"Testing Program Results Validate GE's H Gas Turbine High Efficiency, Low Cost of Electricity and Low Emissions", Slide Presentation –working draft, (no date available).

"The Next Step in H. . . For Low Cost Per kW–Hour Power Generation", LP–1 PG '98.

"Utility Advanced Turbine System (ATS) Technology Readiness Testing and Pre–Commercialization Demonstration", Document #486040, Oct. 1–Dec. 13, 1996., Publication Date, Jun. 1, 1997, Report Numbers: DOE/MC/31176—5628,.

"Utility Advanced Turbine System (ATS) Technology REadiness Testing —Phase 3", Document #666274, Oct. 1–Sep. 30, 1997, Publication Date. Dec. 31, 1997, DOE/MC/31176–10.

"Utility Advanced Turbine System (ATS) Technology Readiness Testing and Pre–Commerical Demonstration, Phase 3", Document #486029, Oct. 1–Dec. 31, 1995, Publication Date, May 1, 1997, Report Nos: DOE/MC/31176–5340.

"Utility Advanced Turbine System (ATS) Technology Readiness Testing and Pre–Commercial Demonstration –Phase 3", Document #486132, Apr. 1–Jun. 30, 1976, Publication Date, Dec. 31, 1996, Report Nos: DOE/MC/31176–5660.

"Utility Advanced Turbine System (ATS) Technology Readiness Testing and Pre–Commercial Demonstration —Phase3", Document #587906, Jul. 1 –Sep. 30, 1995, Publication Date, Dec. 31, 1995, Report Nos: DOE/MC/31176–5339.

"Utility Advanced Turbine System (ATS) Technology Readiness Testing and Pre–Commercial Demonstration" Document #666277, Apr. 1 –Jun. 30, 1997, Publication Date, Dec. 31, 1997, Report Nos: DOE/MC/31176–8.

"Utility Advanced Turbine System (ATS) Technology Readiness Testing and Pre–Commercialization Demonstration" Jan. 1 –Mar. 31, 1996, DOE/MC/31176—5338.

"Utility Advanced Turbine System (ATS) Technology Readiness Testing : Phase 3R", Document #756552, Apr. 1 –Jun. 30, 1999, Publication Date, Sep. 1, 1999, Report Numbers: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Numbers: DOE/MC/31176–17.

"Utility Advanced Turbine System (ATS) Technology Readiness Testing and Pre–Commercial Demonstration", Annual Technical Progress Report, Reporting Period: Jul. 1, 1995 –Sep. 30, 1996.

"Utility Advanced Turbine Systems (ATS) Technology Readiness Testing", Phase 3R, Annual Technical Progress Report, Reporting Period: Oct. 1, 1997 –Sep. 30, 1998.

"Utility Advanced Turbine System (ATS) Technology Readiness Testing", Document ·7450405, Oct. 1 –Dec. 30, 1998, Publication Date: May 1, 1999, Report Numbers: DE–FC21–95MC31176–20.

"Utility Advanced Turbine Systems (ATS) Technology Readiness Testing", Document #1348, Apr. 1 –Jun. 29, 1998, Publication Date Oct. 29, 1998, Report Nos DE–FC21–95MC31176—18.

"Utility Advanced Turbine Systems (ATS) Technology Readiness Testing –Phase 3", Annual Technical Progress Report, Reporting Period: Oct. 1, 1996 –Sep. 30, 1997.

"Utility Advanced Turbine Systems (ATS) Technology Readiness Testing and Pre–Commercial Demonstration", Quarterly Report, Jan. 1 –Mar. 31, 1997, Document #666275, Report Nos: DOE/MC/31176–07.

"Proceedings of the 1997 Advanced Turbine Systems", Annual Program Review Meeting, Oct. 28–29, 1997.

LUBRICATING SYSTEM FOR THERMAL MEDIUM DELIVERY PARTS IN A GAS TURBINE

RELATED APPLICATIONS

This application is a continuation of application Ser. No. 09/368,458, filed Aug. 3, 1999 now abandoned, which was a continuation of provisional application Ser. No. 60/095,662, filed Aug. 7, 1998, the disclosures of which are incorporated herein by reference.

The Government of the United States of America has rights in this invention pursuant to COOPERATIVE AGREEMENT NO. DE-FC21-95MC31176 awarded by the U.S. Department of Energy.

BACKGROUND OF THE INVENTION

The present invention relates to gas turbines having rotational components cooled by a thermal medium flowing within the gas turbine rotor and particularly relates to coatings on the thermal medium supply and return tubes, supporting elements and seal assemblies therefor to reduce the coefficient of friction between the tubes and the supporting elements and between seal surfaces. In my prior U.S. patent application Ser. No. 09/334,187, filed Jun. 16, 1999, there is disclosed a gas turbine having a closed cooling circuit for supplying a thermal medium, for example, cooling steam from a rotor bore, radially outwardly toward the rim of the rotor, axially along the rotor rim and radially outwardly to turbine buckets for cooling the buckets. Additionally, the cooling circuit includes a return for the now-heated cooling thermal medium to a supply via the rotor rim, and the bore tube assembly. In that arrangement, a plurality of circumferentially spaced supply and return tubes extend through openings in stacked rotor wheels and spacers forming the rotor body. The supply and return tubes have lands at axially spaced positions along the tubes for contact with support elements in the wheels and spacers.

These axial tubes and support elements are located at a significant radial distance from the axis of the rotor. Those locations subject the tubes to substantial centrifugal forces during turbine operation, which causes significant contact forces between the tubes and the supporting elements. Moreover, because the tubes carry the thermal cooling medium, the tubes will heat more quickly than the rotor structure, causing axial displacement of the tubes relative to the rotor structure and supporting structure. The contact force caused by the centrifugal action of the rotor rotation, coupled with the contact friction coefficient, produces a substantial axial resistance to thermal expansion of the tubes. The magnitude of this resistance to axial displacement of the tubes is a direct determinant of the state of axial stresses in the tubes. Consequently, there is a need to reduce the axial stresses of the thermal medium carrying tubes to improve the service life of the tubes.

In addition, there are seal assemblies at the interface of axially adjacent wheels and spacers to seal between the respective cavities between the wheels and spacers surrounding the tubes and cavities outwardly of the tube supporting elements. Those tube supporting elements each include a bushing, an axially opposite sleeve spaced from the bushing and an annular tapered seal ring in an annular recess in the bushing engaging the bushing and the sleeve. The mating surfaces of the sealing ring and the bushing and sleeve also wear over time, requiring replacement of the seal and ring.

BRIEF SUMMARY OF THE INVENTION

In accordance with a preferred embodiment of the present invention, to reduce the axial stresses in the thermal medium carrying tubes, the coefficient of friction between the tubes and their supporting elements is substantially reduced. Particularly, coatings are provided on one or both of the contacting surfaces between the tubes and the supporting elements for the tubes. Particularly, the coatings are provided on lands of the tubes and the inside contact surfaces of bushings supporting the tubes in the rotor. The surfaces to be coated are first roughened, for example, by shot peening to impart compressive stresses in the metal. A cobalt-based alloy, for example, Triballoy T800, is applied to the roughened surface at high temperature. The coating is sprayed onto the surface at high velocity to form a substantial bond at the molecular level with the nickel-based alloy of the tubes and support elements, e.g., bushings, and without disruption of the parent metal. This initial coating is then machined to provide a smooth base for the application of a second coating and to provide a smooth interface between the tubes and supporting elements. The second coating is an anti-wear/fretting/galling ceramic-based lubricant. This lubricant is sprayed onto the initial coating and baked, for example, at 1000° F., for about one-half hour and at reduced temperature, for example, 500° F., for about another half-hour. The lubricant is a dry film lubricant containing molybdenum disulfide, graphite, a lead-based glass frit and antimony trioxide. The lubricant contains less than 1% of water. With the foregoing coatings applied both to the outer surface of the tube lands and to the inside arcuate surfaces of the bushings, a very low coefficient of frictional contact between those surfaces is provided, affording low resistance to axial movement of the tubes relative to the supporting elements. This, in turn, improves the wear life of the interfacing parts.

The coatings are also applied to the contacting surfaces of the seal assemblies and particularly the seal ring and the adjacent bushing and sleeve. Thus, the annular recess formed in the bushing and the axial end face of the sleeve are coated, as previously described. Additionally, the inner and outer contact surfaces of the sealing ring are likewise coated such that a low coefficient of friction contact between the sealing ring and the bushing and sleeve is afforded.

In a preferred embodiment according to the present invention, there is provided in a gas turbine having metal tubes for conveying a cooling medium and metal support surfaces for the tubes, a coating on one of the tubes and surfaces affording a low coefficient of friction between one of the tubes and the surfaces at an interface therebetween, comprising a first coating of cobalt-based alloy overlying base material of one of the tubes and the surfaces and a second ceramic-based coating overlying the first coating.

In a further preferred embodiment according to the present invention, there is provided for a gas turbine, a tube for supplying a cooling medium, said tube having raised lands at axially spaced locations therealong for mounting the tubes in support elements for the turbine, a coating on the outer surfaces of the lands affording a low coefficient of friction between the lands and the supporting elements at an interface therebetween, the coating comprising a first cobalt-based alloy overlying the lands of the tube and a second ceramic-based coating overlying the first coating to reduce friction between the lands and the supporting elements.

In a still further preferred embodiment according to the present invention, there is provided in a gas turbine having a rotor comprised of axially stacked rotor wheels and spacers and aligned openings spaced from an axis of rotation of the rotor, the aligned openings of the wheels and spacers receiving a tube extending in an axial direction, a seal assembly about the tube at an interface of one of the wheels and one of the spacers, comprising a generally annular seal support in part received in a first opening in one of the wheels and spacers and including a generally radially extending flange in axial registration with an opposed face of another of the wheel and spacer, a seat bushing in part received in a second opening of another wheel and spacer in axial opposition to the first opening and having a seat, a seal between the seal support and the bushing, the seal including an annular frustoconically-shaped element having a radial outer edge portion engaging the seal support and a radially inner edge portion engaging the seat for sealing between the seal support and the seat, a first cobalt-based alloy overlying base material of one of the seal supports and the outer edge portion of the seal ring and a second ceramic-based coating overlying the first coating, a third cobalt-based alloy overlying one of the seat and the radially inner edge portion of the seal element and a fourth ceramic-based coating overlying the third coating.

DETAILED DESCRIPTION OF THE INVENTION

Figure 1:
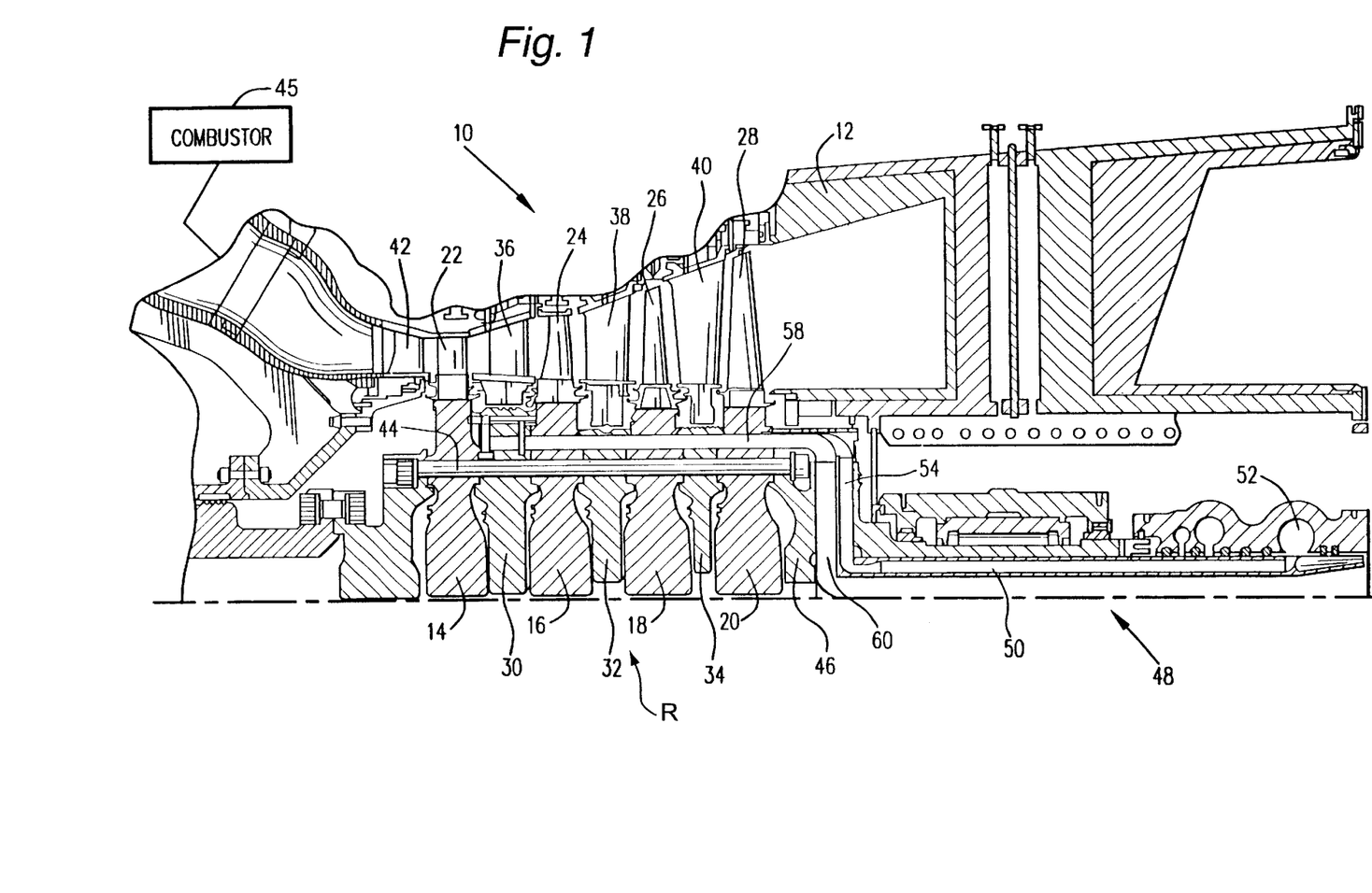
FIG. 1 is a cross-sectional view of a portion of a gas turbine illustrating a turbine section.

Referring to FIG. 1, there is illustrated a turbine section, generally designated 10, incorporating the present invention. The turbine section 10 includes a turbine housing 12 surrounding a turbine rotor R. Rotor R includes in the present example four successive stages comprising wheels 14, 16, 18 and 20, carrying a plurality of circumferentially spaced buckets or blades 22, 24, 26 and 28, respectively. The wheels are arranged alternately between spacers 30, 32 and 34. The outer rims of spacers 30, 32 and 34 lie in radial registration with a plurality of stator blades or nozzles 36, 38 and 40, with the first set of nozzles 42 lying forwardly of the first buckets 22. Consequently, it will be appreciated that a four-stage turbine is illustrated wherein the first stage comprises nozzles 42 and buckets 22; the second stage, nozzles 36 and buckets 24; the third stage, nozzles 38 and buckets 26 and, finally, the fourth stage, nozzles 40 and buckets 28. The rotor wheels and spacers are secured one to the other by a plurality of circumferentially spaced bolts 44 passing through aligned openings in the wheels and spacers. A plurality of combustors, one being illustrated at 45, are arranged about the turbine section to provide hot gases of combustion through the hot gas path of the turbine section in which the nozzles and buckets for rotating the rotor are disposed. The rotor also includes an aft disk 46 formed integrally with a bore tube assembly, generally designated 48.

Figure 2:
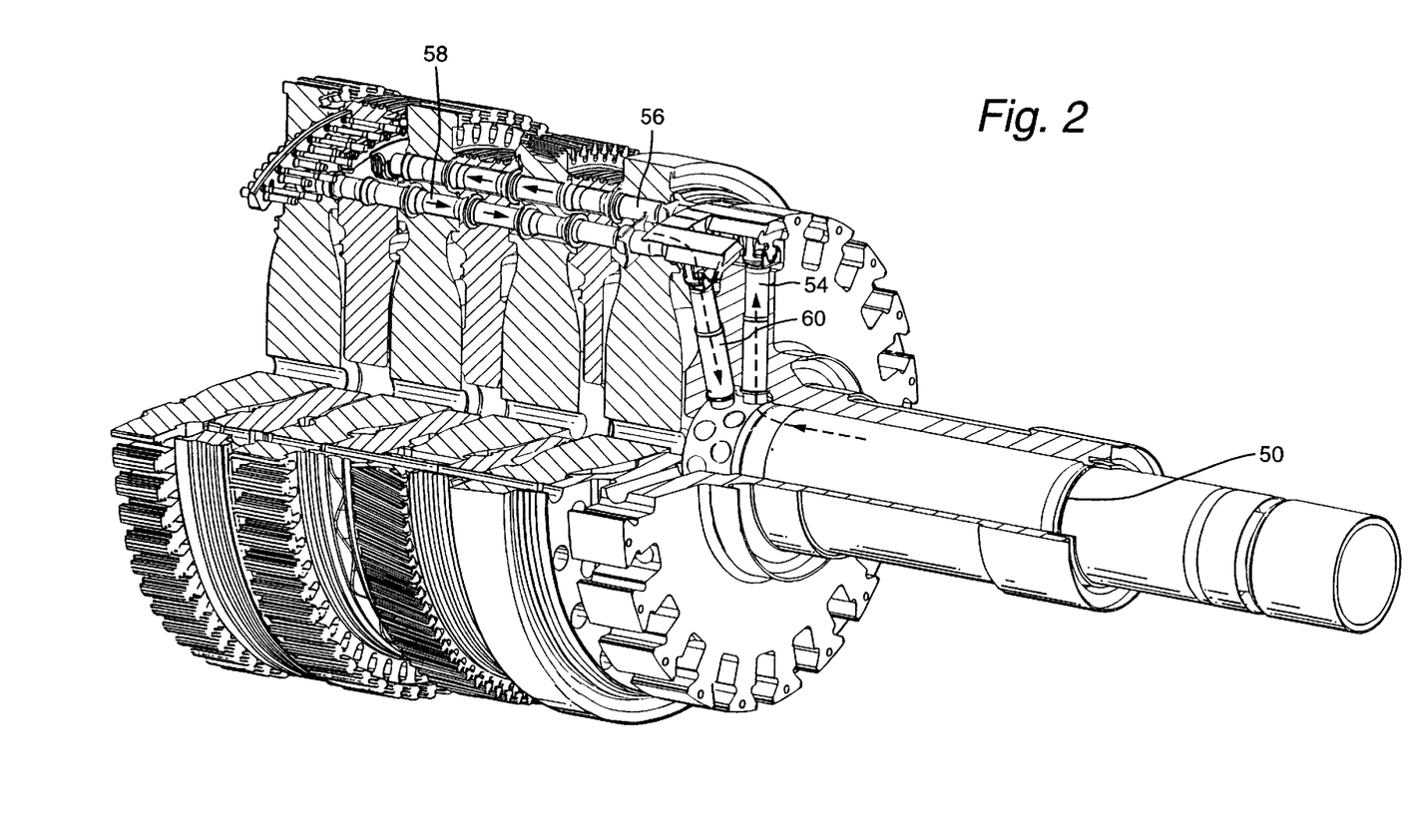
FIG. 2 is a fragmentary perspective view of portions of a turbine rotor with parts broken out and in cross-section for ease of illustration.

At least one and preferably both sets of buckets 22 and 24 of the first two stages are provided with a thermal medium for cooling, the thermal medium preferably being cooling steam. Cooling steam is provided and returned through the bore tube assembly 48. With reference to FIGS. 1 and 2 and in a preferred embodiment, the bore tube assembly includes an annular passage 50 supplied with cooling steam, from a steam plenum 52 for flow to a plurality of radially extending tubes 54 provided in the aft disk 46. Tubes 54 communicate with circumferentially spaced, axially extending thermal medium supply tubes 56 in communication with cooling passages in the first and second-stage buckets. Spent or returned cooling steam at an elevated temperature flows from the first and second-stage buckets through a plurality of circumferentially spaced, axially extending return tubes 58. Return tubes 58 communicate at their aft ends with radially inwardly extending return tubes 60 in aft disk 46. From tubes 60, the spent steam flows into the central bore of the bore tube assembly 48 for return to a supply or for flow to steam turbines for use in a combined-cycle system.

Figure 3A:
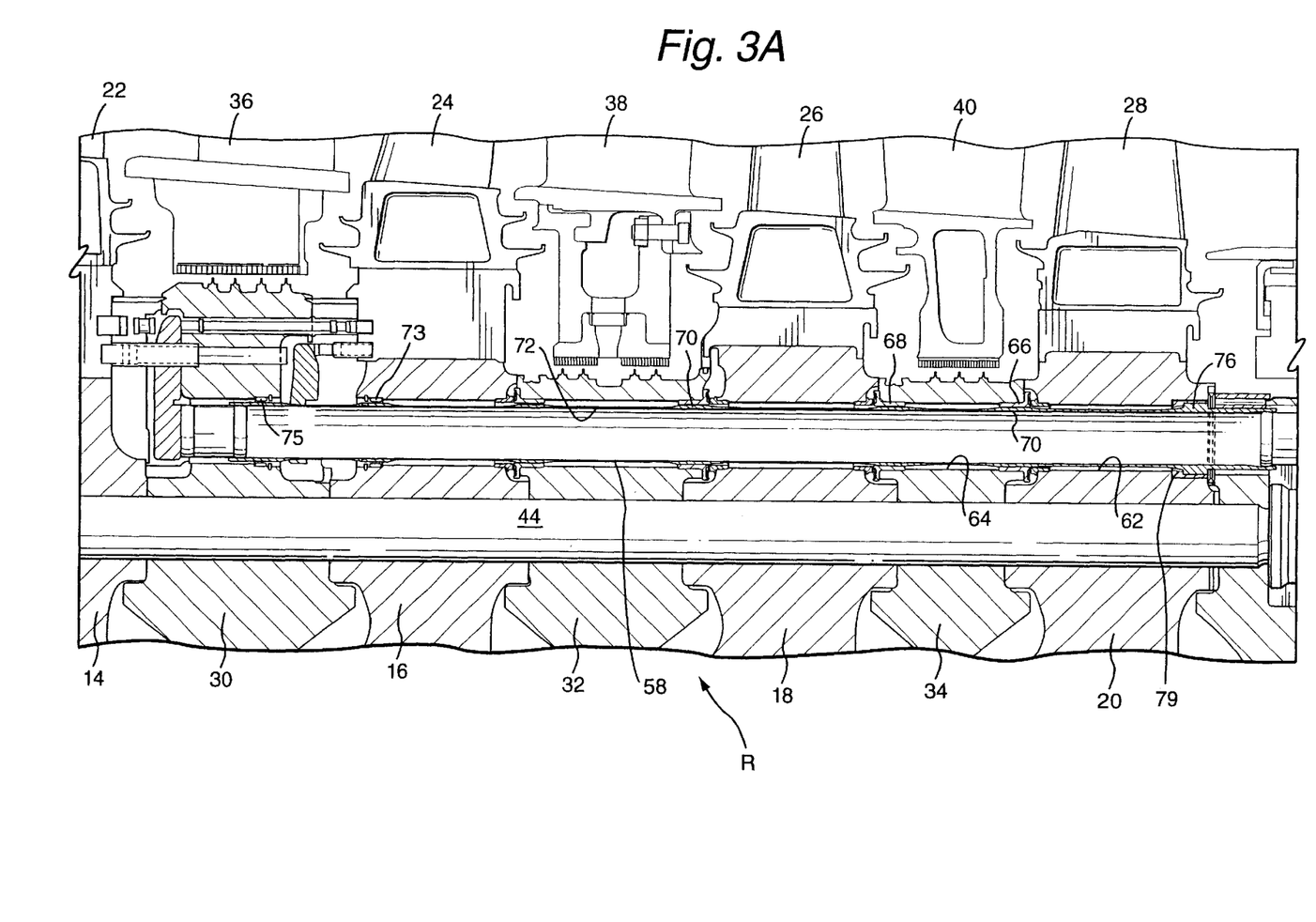
FIG. 3A is a fragmentary enlarged cross-sectional view illustrating, in cross-section, a rim of the rotor with the thermal medium return tube being illustrated.
Figure 3B:
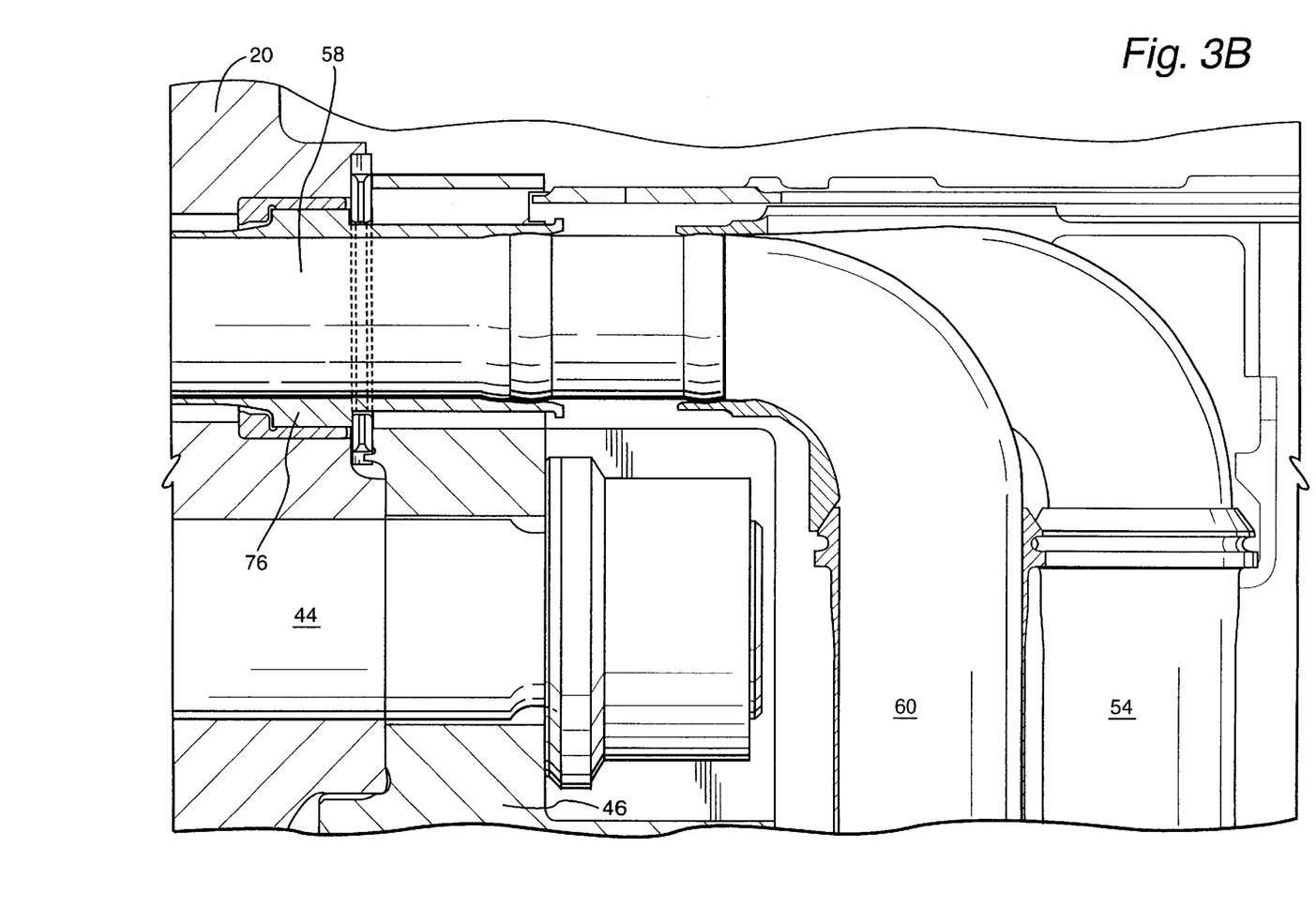
FIG. 3B is an enlarged cross-sectional view of an aft portion of the rotor adjacent its rim illustrating the location of the aft land of a thermal medium return tube and supporting busing according to the present invention.

It will be appreciated from the foregoing description that the axially extending supply and return tubes 56 and 58, respectively, lie adjacent the rim of the rotor, with each supply and return tube extending through axially aligned openings through the axially stacked wheels and spacers. For example, the aligned openings 62 and 64 of wheels 20 and spacers 34, respectively, are illustrated in FIG. 3A. Similar aligned openings are provided in the wheels and spacers of the first, second and third stages.

As illustrated in FIG. 3A, support elements comprising bushings are provided at various locations within the openings of the wheels and spacers for supporting the cooling medium supply and return tubes 56 and 58, respectively. For example, bushings 66 and 68 are disposed adjacent opposite ends of the opening 64 through spacer 34. Similar bushings are disposed at opposite ends of the 2–3 spacer 32. Bushings 73 and 75 are provided at the forward opening of wheel 16 and the aft opening of spacer 30. A bushing 79 is also illustrated at the aft end of the opening through the fourth wheel 20. Similar bushings are provided in the aligned openings for the supply tube. Also, seal assemblies are provided in certain of the bushings and the bushing/seal combination is described hereinafter with respect to FIG. 8.

Figure 4:
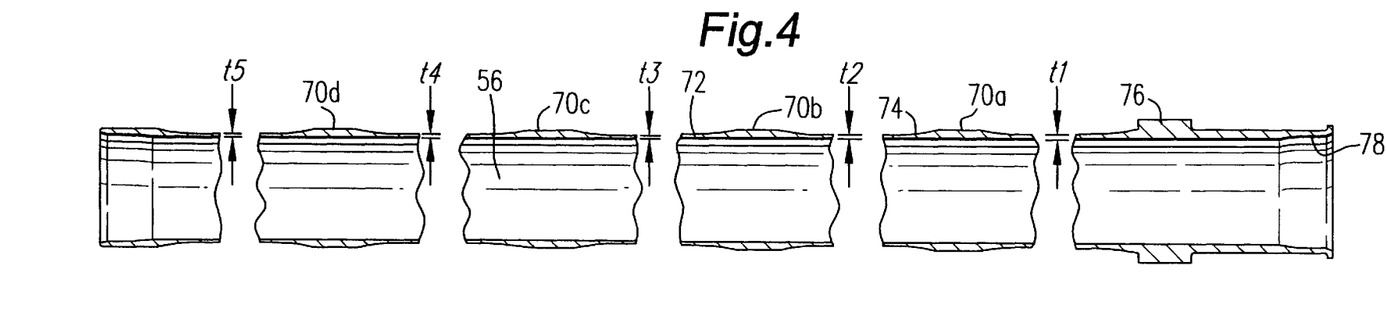
FIGS. 4 and 5 are fragmentary cross-sectional views of the thermal medium supply and return tubes, respectively, with portions broken out for ease of illustration.
Figure 5:
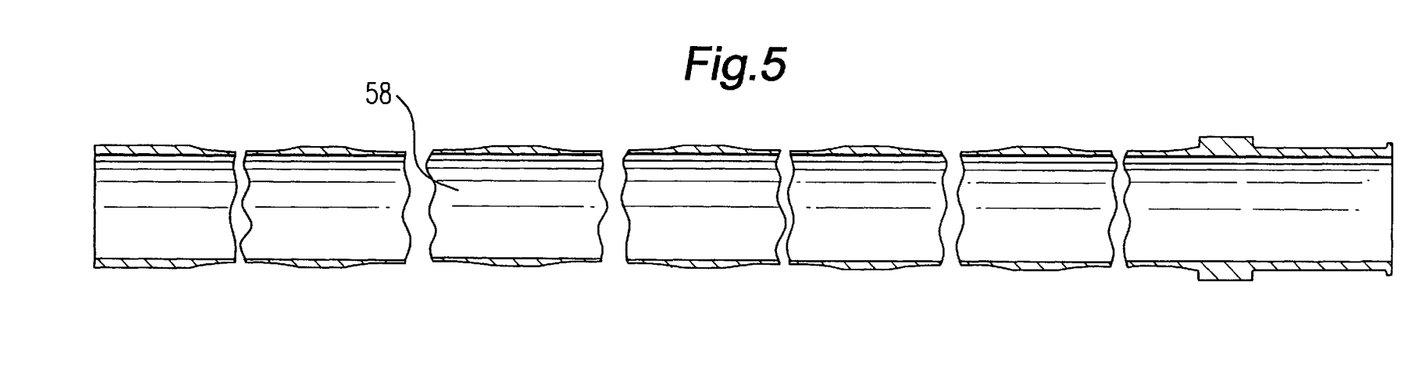
Figure 6:
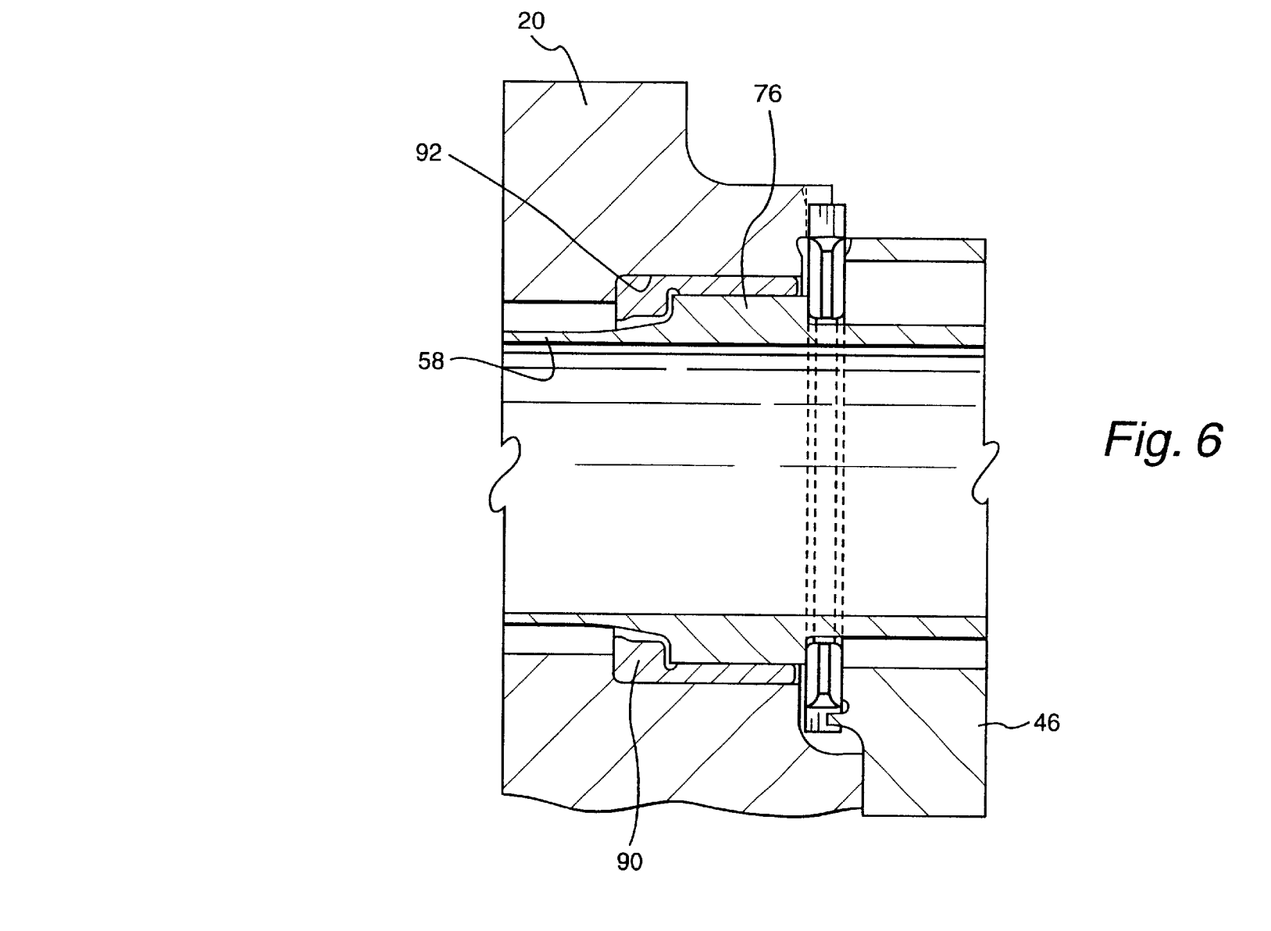
FIG. 6 is an enlarged fragmentary cross-sectional view illustrating the aft land and supporting bushing.

Referring to FIGS. 4 and 5, the respective supply and return tubes 56 and 58 are illustrated. The tubes are similar in aspects relevant to this invention and a description of one will suffice as a description of the other, except as otherwise noted. Each tube comprises a thin-walled structure having a plurality of raised lands 70 at axially spaced locations along the length of the tube. The axial locations of the lands 70 coincide with the locations of the bushings in the openings through the wheels and spacers. Between the lands 70 are thin-walled tube sections 72 (FIG. 3A). From a review of FIGS. 4 and 5, it will be appreciated that the outer exterior surfaces of the lands 70 are radially outwardly of the exterior surface of the thin-walled sections 72. Transition sections 74 are provided between each land 70 and adjacent thin-walled sections 72. The transition sections 74 have arcuate outer surfaces transitioning radially inwardly from the outer surfaces of the lands to the outer surfaces of the thin-walled sections 72. These transition areas 74 smooth the stresses from the raised lands to the thin sections. An enlarged land or flange 76 is provided adjacent an aft portion of each tube, for reasons explained below. As illustrated in FIG. 4, the interior end portions of the supply tubes 56 have concave surfaces 78 for mating engagement with convex surfaces of spoolies for flowing the thermal medium into and out of the return tubes.

It will be appreciated that the thin-walled sections are not supported between the lands and that, in the high centrifugal field during rotor rotation, the heavier the tube, the greater will be the friction forces carried by the tubes at the support points between the lands and the bushings. As the tubes are subjected to thermal or mechanical stresses, the higher the loading at the supports, the higher the friction load as the tube thermally grows in an axial direction from its fixed aft end. As a result of fixing the aft end of the tubes, the friction load developed at each support point creates a loading which is cumulative from forward to aft. That is, actual tube loading from thermal growth increases in the aft direction. By varying the thicknesses along the tube and particularly increasing the thicknesses of the tube in the aft direction, the higher frictional loads forwardly of each support can be accommodated. Stated differently, the thinner each thin-walled section becomes in the forward axial direction, the less weight a given support carries and, consequently, a smaller friction load is generated under thermal growth conditions. Because the tubes are fixed at their aft ends, the thermal growth moves axially forwardly. At each support location, the accumulating frictional loading is the loading at that location with the added loading of locations axially forwardly of the given location.

Particularly, the thicknesses t1–t5 of the thin-walled sections 72 between the lands 70 decrease in thickness from the aft end of the tubes 56 and 58 to their forward ends. That is, the wall thickness t1 of the thin-walled section 72 between axially spaced flange 76 and land 70$a$ is thicker than the wall thickness t2 between axially adjacent lands 70$a$ and 70$b$. Similarly, the wall thickness t2 is greater than the wall thickness t3 of the thin-walled section 72 between axially adjacent lands 70$b$ and 70$c$. The wall thickness t3 is greater than the wall thickness t4 between lands 70$c$ and 70$d$. The wall thickness t4 is greater than the wall thickness t5 between axially adjacent lands 70$d$ and the forward end of the tube. Thus, the wall thicknesses of the thin-walled sections 72 decrease from the aft ends of the tubes toward the forward ends of the tubes.

Figure 7:
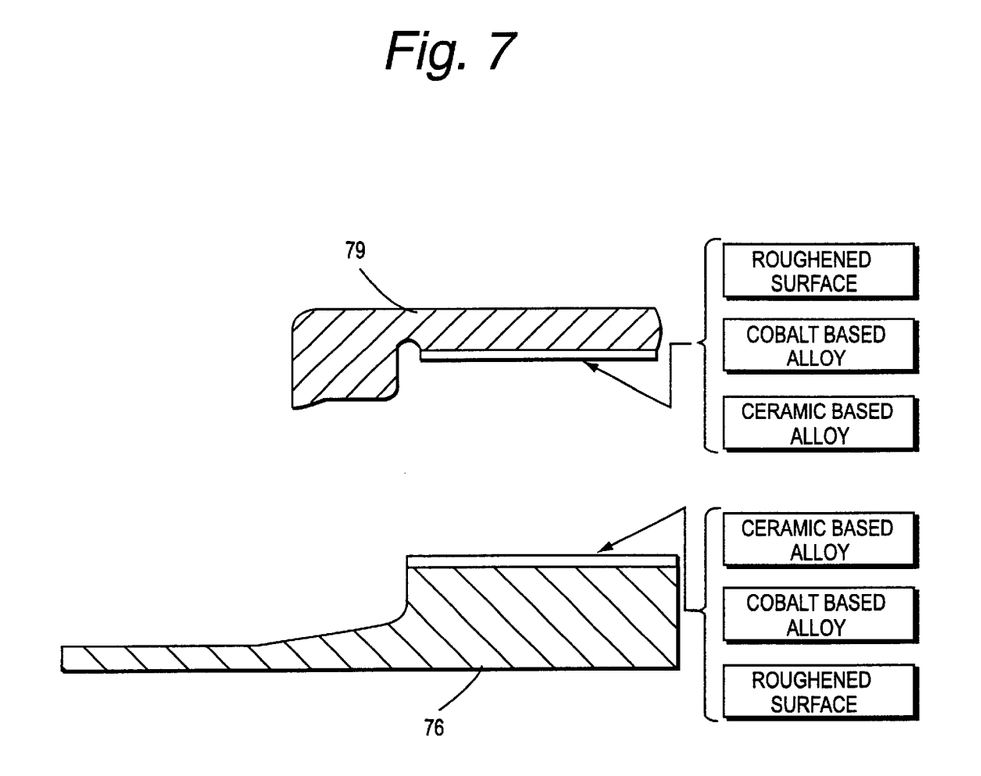
FIG. 7 is an exploded schematic representation of the coatings on the interior face of the support elements and the exterior surfaces of the lands of the thermal medium carrying tubes.

In addition to reducing the friction load developed at each support point by varying the thickness of the tubes, the contacting surfaces of the tubes and supporting elements, for example, the lands and bushings, are provided with low coefficient of friction coatings. Particularly, a first coating is applied to the lands and to the interior surfaces of the bushings in contact with the lands. The first coating is preferably a high density cobalt-based alloy which is spray-coated on the surfaces at very high temperature, e.g., on the order of 5000° F. This cobalt-based alloy comprises about 28 parts molybdenum, 17 parts chromium, 3 parts silicon and the balance cobalt. The coating is preferably Triballoy T800 which is a commercially available coating. The composition of the coating is 28Mo-17Cr-3Si. After this first coating is applied, the surface of the coating is machined to provide a smooth surface. The machining action removes approximately one-half of the thickness of the applied coating.

A second coating overlies the first coating. The second coating is preferably an anti-wear/fretting/galling ceramic-based solid film lubricant, one of which is commercially sold under the tradename Lube-Lok™ by the E/M Corporation. The lubricant comprises molybdenum disulfide. Consequently, a very low coefficient of friction is provided at the interface between the tubes and the supporting elements which forestalls accelerated wear which otherwise would occur upon contact between the bare metal surfaces of the tubes and supporting elements should the film fail, the metal of the surfaces being a nickel alloy.

Figure 8:
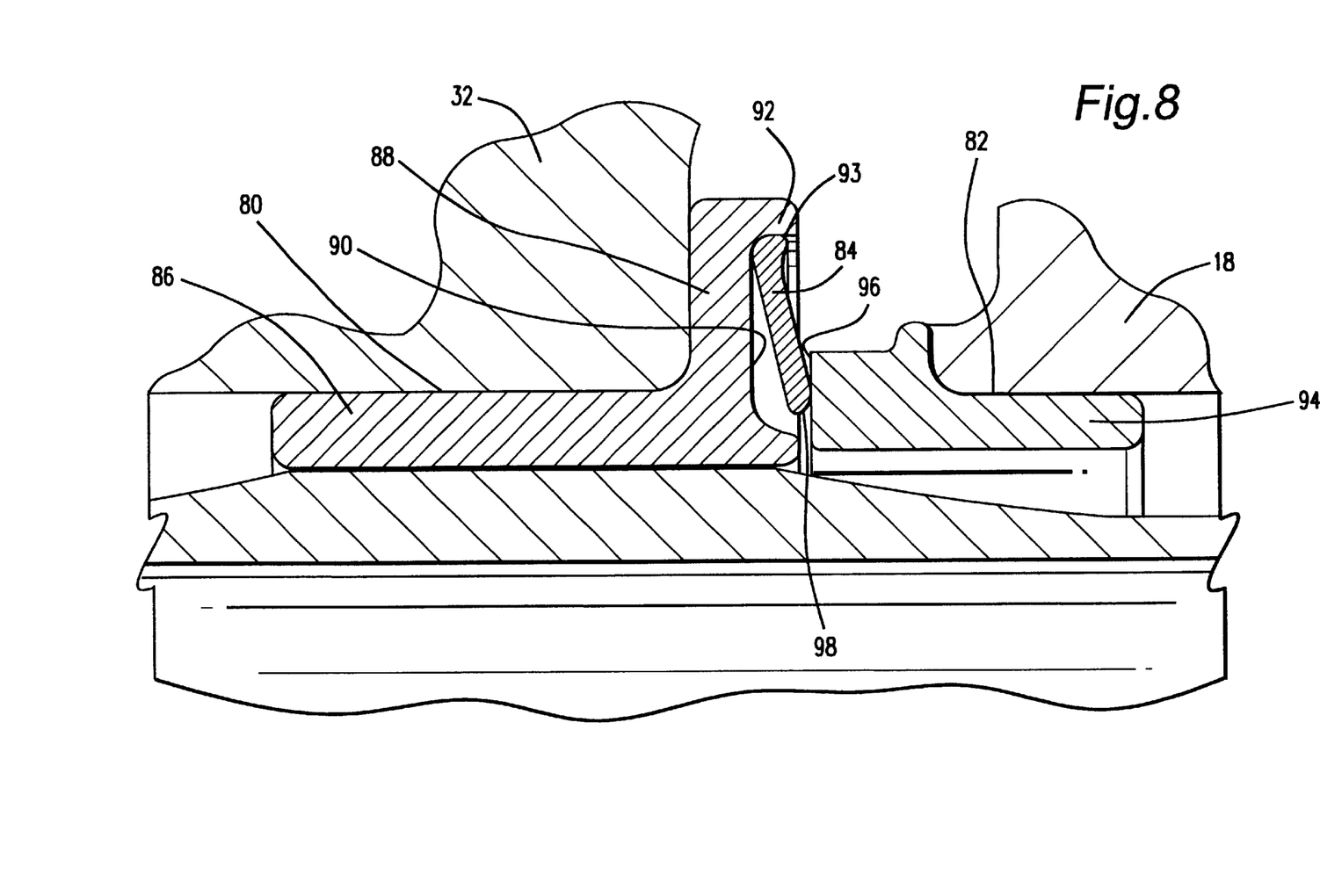
FIG. 8 is an enlarged cross-sectional view of a combined bushing and seal.

Further, seal assemblies are provided between the bushings and sleeves of adjacent wheels and spacers. For example, four seal assemblies are provided for the return tube and lie at the interfaces of the wheel 16, spacer 32; spacer 32 and wheel 18; wheel 18 and spacer 34; and spacer 34 and wheel 20. Referring to FIG. 8, a seal assembly, for example, between wheel 32 and spacer 18, is illustrated and comprises a support bushing 80, a seat bushing 82 and a seal ring 84. Each support bushing 80 includes a sleeve 86 received in a counterbore of its associated spacer 32. Each support bushing 80 also lies at an axial location coincident with a land of the tube and provides support for the tube at that axial location. Bushing 80 has a radially outwardly directed flange 88 adjacent an end of the sleeve 86. The axial end face of flange 88 includes an annular recess 90 for receiving an outer diameter edge of the seal 84. The outer margin 92 of flange 88 serves as a stop for the seal 84. The seat bushing 82 includes a sleeve 94 having an interior diameter greater than the interior diameter of the sleeve 86 of bushing 80. As illustrated, the land underlying the bushing 80 is spaced inwardly of the seat bushing 82. Seat bushing 82 includes an enlarged radial flange mounting an axially facing bearing surface 96 in axial opposition to the flange 88 of bushing 80. Bearing surface 96 serves as a seat for the inner diameter edge 98 of the seal 84. The seal 84 comprises a shallow frustoconical section extending between its inner diameter 98 and the outer diameter 93.

Coatings are applied to the contacting surfaces of the bushing 80, the seal ring 84 and seat bushing 82. That is, the coatings of the present invention are provided along the outer portion of the recess 90, along the end face 96 of the seat bushing 82 and the corresponding contact portions of the seal ring 84. Thus, the coatings are applied to the outer margin of seal ring 84 in contact with bushing 90 and the inner diameter edge 98 of the seal 84.

Prior to applying the coatings to these surfaces, the surfaces are roughened. Preferably, the surfaces are roughened by shot peening to put compressive stresses in the surface to retard crack development, which otherwise precipitates failure. Thus, prior to applying the coatings, the lands, bushing and seal surfaces to be coated are shot peened by blowing glass or metal beads at high velocity onto the surfaces to create depressions and, consequently, compressive stresses in the metal. The initial coating of Triballoy T800 is then applied by spraying the coating at high temperature, for example, at about 5000° F., to the required thickness. The outer surface of the Triballoy coating is somewhat rough and therefore the coating is machined to afford a smooth surface for receiving the second coating. The ceramic-based second coating is sprayed onto the cobalt-based first coating and baked, for example, at about 1000° F. for approximately one-half-hour and at above 500° F. for another half-hour. No further machining is required. It will be appreciated that the coatings are applied to both the outer surfaces of the lands, the interior surfaces of the bushings, and the contact surfaces between the seal rings and the bushings and at like thicknesses. Consequently, the interface between the tubes and the support elements comprises the two low coefficient of friction outer lubricant coatings. The contact between those surfaces offers very low resistance to axial movement of the tubes relative to the bushings and hence accommodates thermal expansion of the tubes. Additionally, the surface life of the tubes is greatly extended by this reduction in resistance to axial displacement of the tubes relative to the rotor. Also, the resistance to wear of the seal rings and the bushings is substantially increased thereby increasing their wear life.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a gas turbine having metal tubes for conveying a cooling medium and metal support surfaces for said tubes, a coating on one of said tubes and surfaces affording a low coefficient of friction between said one of said tubes and said surfaces at an interface therebetween, comprising:

a first coating of cobalt-based alloy overlying a base material of said one of said tubes and said surfaces and a second ceramic-based coating overlying said first coating.

2. A coating according to claim 1 wherein each of said tubes and said surfaces at the interface therebetween have a first cobalt-based alloy overlying the base metal of each of said tubes and surfaces.

3. A coating according to claim 1 wherein the base metal comprises a nickel alloy.

4. A coating according to claim 1 wherein the cobalt-based alloy comprises molybdenum.

5. A coating according to claim 1 wherein the cobalt-based alloy comprises chromium.

6. A coating according to claim 1 wherein the cobalt-based alloy comprises silicon.

7. A coating according to claim 1 wherein the cobalt-based alloy comprises cobalt, molybdenum, chromium and silicon.

8. A coating according to claim 1 wherein the cobalt-based alloy comprises about 28 parts molybdenum, 17 parts chromium, 3 parts silicon and substantially the balance of cobalt.

9. A coating according to claim 8 wherein the cobalt-based alloy comprises about 52 parts cobalt.

10. A coating according to claim 1 wherein the ceramic-based alloy comprises molybdenum disulfide.

11. A coating according to claim 1 wherein said one of said tubes and said surfaces has a roughened surface underlying said cobalt-based alloy.

12. For a gas turbine, a tube for supplying a cooling medium, said tube having raised lands at axially spaced locations therealong for mounting the tubes in support elements for the turbine;

a coating on the outer surfaces of said lands affording a low coefficient of friction between the lands and the supporting elements at an interface therebetween, said coating comprising a first cobalt-based alloy overlying the lands of said tube and a second ceramic-based coating overlying said first coating to reduce friction between the lands and the supporting elements.

13. A tube according to claim 12 in combination with the support elements of the gas turbine, said support elements having an internal arcuate surface for bearing against said lands, a coating on said internal arcuate surface comprised of a first cobalt-based alloy overlying the base metal of said bushing and a second ceramic-based coating overlying said first coating on said bushing whereby the interface between said bushing and said lands comprise the ceramic-based coating.

14. In a gas turbine having a rotor comprised of axially stacked rotor wheels and spacers and aligned openings spaced from an axis of rotation of the rotor, the aligned openings of said wheels and spacers receiving a tube extending in an axial direction, a seal assembly about said tube at an interface of one of said wheels and one of said spacers, comprising:

a generally annular seal support in part received in a first opening in one of said wheels and spacers and including a generally radially extending flange in axial registration with an opposed face of another of said wheel and spacer;

a seat bushing in part received in a second opening of said another wheel and spacer in axial opposition to said first opening and having a seat;

a seal between said seal support and said bushing, said seal including an annular frustoconically-shaped element having a radial outer edge portion engaging said seal support and a radially inner edge portion engaging said seat for sealing between said seal support and said seat;

a first cobalt-based alloy overlying a base material of one of said seal supports and said outer edge portion of said seal ring and a second ceramic-based coating overlying said first coating;

a third cobalt-based alloy overlying one of said seat and said radially inner edge portion of said seal element; and a fourth ceramic-based coating overlying said third coating.

* * * * *